7333X
H. STANLEY.
Cooking Stove.
Patented Dec. 17, 1832.
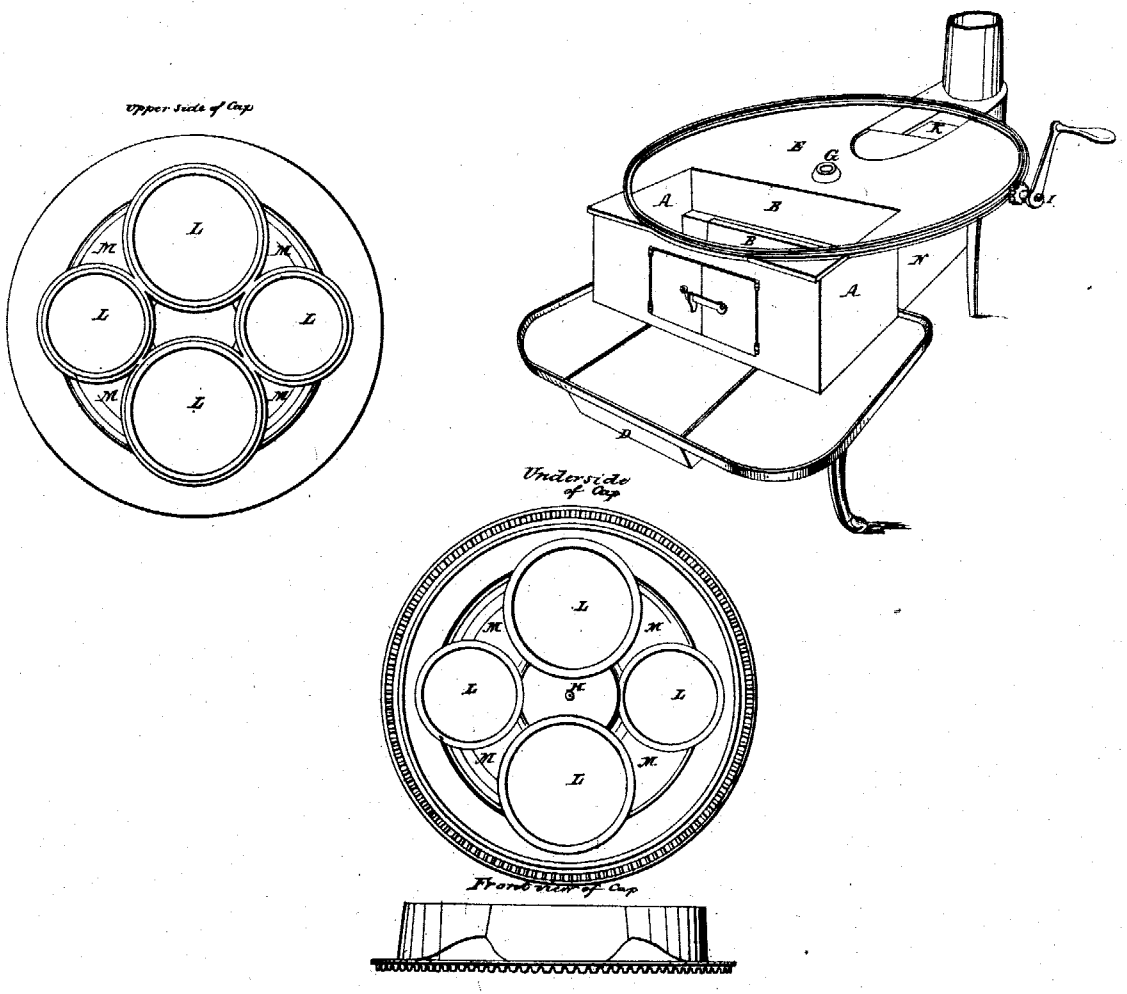
THE NORRIS PETERS CO., PHOTO-LITHO., WASHINGTON, D. C.

7333x Dec 17 1832 17

Henry Stanley

91

The Schedule referred to in these Letters Patent and
making part of the same

To all whom these presents shall
come Greeting. Know ye that I Henry Stanley
of Poultney in the County of Rutland and State of Ver-
mont have invented a new and useful improvement in
the revolving Cooking Stove so called, and the following is a
description of my said invention and improvement, it
being an amended specification for a new patent in place
of one surrendered on account of its defective specification
It consists of a fire room suitable to the size of the stove
and the stove may be of such size as to suit the purchaser,
The fire room may be differently constructed for different kinds
of fuel. If it is designed for Anthracite or other coal the
fire room should be lined with fire bricks and be furnished
with suitable grates. The fire room is formed of four cast iron
plates set upon and partly covering another cast iron plate
called the hearth or bottom; The back plate when intended
for wood is made of two parts divided at or near the middle
perpendicularly, and when intended for coal the back plate
is divided at or near the middle horizontally or length=
wise. The lower division is placed about one inch within
the upper division and has a projection attached to the
whole length of its upper edge, and running back so as to form
a support for the upper division and also for the fire brick
which forms the back of the furnace. The upper edge of the
plate is exposed to the action of the fire within the furnace
for the purpose of increasing the quantity of heat in the
lower part of the tin oven, or roaster when placed in the
rear of the back plates. The destructive effects of the heat
upon the lower division require that it should be sepcasionally removed and to avoid the expence and trouble of renewing the entire plate an opening is made at or near the upper edge of about two thirds the length and one third the width of the plate. This opening is filled with another moveable plate which may be removed and renewed at pleasure. In the hearth or bottom plate is for-med a sink or ash-pit partly covered by the fire room, and partly by a slideing plate which acts as a damper and regulates the heat. A large circular plate is placed over the fire room, in such a manner that a segment a-bout one third the diameter of the circular plate is occupied by the fire room. This circular plate is covered by another circular plate in diameter something larger which I call the cap or top of the Stove the latter being raised above the former about one inch by rims forming a groove on the upper side of the lower circular plate and a corresponding rim on the under side of the upper circular plate forming a tongue to run in the said groove on which tongue the upper plate rests.

On the centre of the under plate is a small elevation in the form of a cone with a perpendicular orifice into which a pivot projects from the upper plate in order to fix the centre of of the revolution. The revolution is caused by a crank and pinion. The cogs of the pinion work in corresponding ones attached to the under side of the upper plate near the edge which projects beyond the rim. Through the lower circular plate and directly over the fire room is an opening through which the heat & smoke pass. the dimensions of the opening being described by that part of the fire room which comes within the circular rim upon the edge of the under circular plate.

Opposite the fire room and through the same plate is an-other opening through which the smoke passes into the sliding flue to which the pipe is attached to convey the smoke in to the chimney.

7333x Dec 17, 1832 19

The top is pierced with holes of different sizes in number and
dimensions to correspond with the size of the stove, These holes
are to receive boilers and other cooking utensils or articles to
be heated and are raised by means of rims or collars from
2½ to 3 inches deep and converging towards the top for the
purpose of exposing a greater surface of the boilers or other
articles to the action of the heat in its passage from the fire
room to the diving flue. and also for the like purpose as well
as for convenience in casting and to strengthen the plate, I make
flues on the under side of the cap. or top plate leading from
boiler to boiler, and circuitously to the diving flue: as
shown in the drawing originally deposited in the Pat-
ent Office to which I refer as a further illustration of the
parts alluded to in this Specification — In [illegible]
roasting &c may be done in an iron oven constructed
in the back part of the stove in the common way or by
tin reflectors suitably constructed and placed upon the
top and in front of the stove, and in rear of the fire room and
under that part of the circular plate which is not occupied
by the fire room. Summary - All I claim as my inven-
tion is the combination of any one or more of the following
particulars in the said stove as above described when com-
bined with a revolving top plate. First the flues in the
revolving top plate. Second the rims or collars
surrounding the cooking utensils. Third the frame as
above described, and the tongue on which the upper plate
rests. Fourth. the rack and pinion used to cause the
revolution of the top plate, But I do not claim
as my invention any one of the above described parts
or combination of them independently of their connect-
ion with a revolving top plate, neither do I claim the
invention of a revolving top plate.

Witnesses. Thomas [illegible] Henry [illegible]
[illegible] Wm Thompson

[illegible]